United States Patent
Ferrer-Dalmau Nieto et al.

(10) Patent No.: US 9,821,835 B2
(45) Date of Patent: Nov. 21, 2017

(54) POWER STEERING SYSTEM FOR AUTOMOBILES

(71) Applicant: Microelectronica Maser, S.L., Mendaro (Guipuzcoa) (ES)

(72) Inventors: Francisco Ferrer-Dalmau Nieto, Mendaro (ES); Francisco Javier Vicandi Unanue, Mendaro (ES); Carlos Javier Iriondo Arrizabalaga, Mendaro (ES); Jesus Maria Iriondo Arrizabalaga, Mendaro (ES)

(73) Assignee: MICROELECTRONICA MASER, S.L., Mendaro (Guipuzcoa) (ES)

( * ) Notice: Subject to any disclaimer, the term of this patent is extended or adjusted under 35 U.S.C. 154(b) by 226 days.

(21) Appl. No.: 14/426,807

(22) PCT Filed: Jul. 16, 2013

(86) PCT No.: PCT/ES2013/070512
§ 371 (c)(1),
(2) Date: Mar. 9, 2015

(87) PCT Pub. No.: WO2014/037595
PCT Pub. Date: Mar. 13, 2014

(65) Prior Publication Data
US 2015/0232119 A1    Aug. 20, 2015

(30) Foreign Application Priority Data
Sep. 7, 2012    (ES) .................................. 201231385

(51) Int. Cl.
*B62D 5/04* (2006.01)
*B62D 5/26* (2006.01)
(Continued)

(52) U.S. Cl.
CPC .......... *B62D 5/0418* (2013.01); *B60G 15/02* (2013.01); *B62D 5/26* (2013.01); *B62D 7/146* (2013.01)

(58) Field of Classification Search
CPC .......... B62D 5/0418; B62D 5/26; B62D 5/28; B62D 7/06; B62D 7/146; B62D 17/00
See application file for complete search history.

(56) References Cited

U.S. PATENT DOCUMENTS

| 1,840,407 A | * | 1/1932 | Norman | ................... B60K 1/02 180/10 |
| 4,355,697 A | * | 10/1982 | Orlandea | ................. B62D 7/06 180/261 |

(Continued)

FOREIGN PATENT DOCUMENTS

| CN | 102069843 A | | 5/2011 |
| CN | 203094172 | * | 7/2013 |

(Continued)

*Primary Examiner* — Joseph M Rocca
*Assistant Examiner* — Maurice L Williams
(74) *Attorney, Agent, or Firm* — Jacobson Holman, PLLC.

(57) ABSTRACT

Steering boxes currently available on the market in order to convert the rotation of the steering wheel into the angular rotation of the wheels are not suitable to be partially built into the rim of the wheels of an electric car. In addition, existing boxes do not allow the independent rotation of the wheels or wide turning radii. These limitations are overcome using a system comprising: a body into which at least one motor is built using corresponding supports, which motor(s) actuate(s) the steering rotation axle of each steered wheel in the upper part of the body, and, in the lower part, a transmission gearbox and a stationary circular crown gear with which driving pinions mesh, said pinions rotating about (Continued)

the crown gear, thereby rotating the entire body and the rotation axle of the wheel built into the body together with suitable means.

11 Claims, 7 Drawing Sheets

(51) Int. Cl.
    *B62D 5/14*    (2006.01)
    *B62D 7/14*    (2006.01)
    *B60G 15/02*    (2006.01)

(56) References Cited

U.S. PATENT DOCUMENTS

| | | | |
|---|---|---|---|
| 6,491,127 B1* | 12/2002 | Holmberg | B60K 7/0007 180/21 |
| 6,561,307 B1* | 5/2003 | Brill | B62D 5/0418 180/402 |
| 2003/0111289 A1* | 6/2003 | Brill | B62D 5/0418 180/431 |
| 2006/0266574 A1* | 11/2006 | Lundmark | B60G 7/008 180/432 |
| 2007/0045036 A1* | 3/2007 | Takeuchi | B62D 5/0418 180/411 |
| 2008/0004148 A1* | 1/2008 | Rogg | B62D 5/0418 475/169 |
| 2010/0051377 A1* | 3/2010 | Sugitani | B62D 7/224 180/443 |
| 2010/0206647 A1* | 8/2010 | Ishii | B60K 17/30 180/6.24 |
| 2011/0168474 A1* | 7/2011 | Checketts | B60K 7/0007 180/237 |
| 2012/0111648 A1* | 5/2012 | Terashima | A61G 5/046 180/6.2 |
| 2014/0353054 A1* | 12/2014 | Matayoshi | B60G 3/20 180/55 |
| 2015/0027801 A1* | 1/2015 | Amino | B62D 5/0418 180/446 |

FOREIGN PATENT DOCUMENTS

| | | | | |
|---|---|---|---|---|
| DE | 102004001727 A1 * | 8/2005 | | B60G 3/01 |
| ES | 2405846 A2 | 6/2013 | | |
| JP | H1-152128 U | 10/1989 | | |
| JP | 2008-189007 A | 8/2008 | | |
| JP | 2010-076528 A | 4/2010 | | |
| KR | 2011-0054559 A | 5/2011 | | |
| WO | 2012/026301 A1 | 3/2012 | | |

\* cited by examiner

POWER STEERING SYSTEM FOR AUTOMOBILES

OBJECT OF THE INVENTION

More specifically, the invention refers to the automotive sector, to the integration of a steering system in the wheels of an automobile, thus eliminating ail the components that are conventionally used, such as (among others), the steering column and steering box, which transforms rotating movement into longitudinal movement of the steering arm, located at the ends of the steering box, producing a gear reduction to turn the wheels.

Another of the aims of the invention is that the steering system presented here includes mechanisms that enable the turning of the wheels, electrically, pneumatically or hydraulically, used as energy systems for motors of the same nature.

STATE OF THE ART

The manufacture of electric and internal combustion automobiles is not new and dates back to the end of the 19th century, however, constant evolution in the nature and performance of motors, especially electric motors, and batteries that power them, have given rise to innumerable types and variants.

At the same time, the materials used to build the different parts of an automobile have been constantly improved, being lighter, tougher and longer lasting, therefore, a certain amount of energy (of any sort) makes the vehicle cover a longer distance.

Alternatively, while manufacturing processes for vehicles that do not use an internal combustion engine have changed from simply handmade to mass produced, and more recently there has been a process of modular manufacturing, i.e., the different parts of a product are manufactured in production plants distant from the assembly plant for the modular based vehicles, and then these modules are assembled in a different plant to where they were made. Modular manufacturing is increasingly used in all manufacturing sectors.

In the current state of the art, the attempts of the Michelin company to integrate an electric motor into the wheel of a vehicle, inside it, together with the suspension and brake systems, therefore by putting a tyre on the wheel, it will eliminate current motor, transmission, suspension and brake systems. This system, called Active Wheel, is the basis of the Venturi Voyage concept, as well as WILL, built jointly by the company Heuliez, a specialised manufacturer.

At the same time, the Siemens company has developed the VDO and Corner systems that are embodied in applying motors to each wheel to be used in vehicles with a fuel cell or hybrids. Each wheel not only includes a built in electric motor that moves the vehicle, but also includes an electric steering motor, that offers independent turning of each of the wheels. In addition, this design incorporates an active suspension system and electric brakes.

In the current state of the art, automobile vehicles are provided with a system that varies the trajectory at the will of the driver, for which most systems known consist in varying the longitudinal inclination of the steering wheels to change trajectory.

Most automobiles have a front axle that is used for steering and it is secured to the frame, and each wheel is fitted to the moveable ends called track rods, which turn the wheels.

The steering system of an automobile is a collection of mechanisms that convert the rotation of a steering wheel to the angular turning of the wheels. The steering wheel is joined to the steering column, which is divided into several sections joined by universal joints. The column ends in the steering box, which converts the rotary motion of the column to longitudinal movement of the steering arm, located at the ends of the steering box.

There are basically two types of steering boxes: worm drive and rack and pinion, the latter being predominant on the market, however, this type of steering box cannot be fitted inside the wheel of an automobile, and therefore does not have the modular character that is sought after as one of the aims of the invention.

SCOPE OF THE INVENTION

A steering system for automobiles partially integrated into the wheel of the vehicle, using any type of energy, so that in addition to electricity, hydraulic, pneumatic or other type of energy could be used, totally different from the worm drive and rack and pinion systems that automobiles currently use.

Another of the aims of the invention is a steering system that enables:
  Independent turning of the wheels.
  Wide turning circles.
  The use of two turning motors in each wheel, to ensure turning in case of failure of one of them.
  The effect of losing control of steering when going over a pothole is eliminated.
  Offers more space inside the vehicle because there is no steering column.

DESCRIPTION OF THE INVENTION

The invention described here is a steering system for vehicles, located partially in the automobile wheels and which comprises as an element to highlight in the interior, a box with mechanisms to transmit the movement of motors, a fixed crown and some driving pinions to turn the pivoting axle of the wheel, which is in the suspension arm, so that after fitting the corresponding tyre, each wheel (rim and tyre), incorporates the brakes and one mentioned steering system, the suspension being integrated by the elements necessary to absorb shocks, both the suspended and the non-suspended mass of the vehicle, being outside the wheel.

Acting on said crown gear in the transmission mechanism gearbox, there is at least one motor, initially there will be two for safety reasons, which will transmit the movement to the crown wheel from the straight cut pinions, helical, worm gear, toothed belt and others fitted to the end of the axle of said motors.

The concept of a conventional steering system thus evolves, due to this invention, from a longitudinal rack to a circular crown, with the aforementioned advantages and purposes, comprising as main elements:
  A steering transmission gearbox using motors.
  Suspension with Its arms.
  Body of the power steering system.
  Wheel axle.
  Wheel, rim and tire.

The steering system object of the invention may have multiple applications, or be integrated into the suspension with motors that enable the automobile to be steered parallel to the shock absorbers, or with the motors integrated into the wheel parallel to the ground and at a certain angle to the shock absorbers.

For safety reasons, although not strictly necessary, the proposed steering system will be equipped with one or more electric, pneumatic or hydraulic motors, with direct action on the turning mechanism, which can consist for example of a driving pinion meshed to a crown gear fitted inside the wheel rim.

The suspension will consist of at least one suspension arm, attached to the chassis or another fixed part of the automobile holding the shock absorber, and being the support of the assembly, and a second suspension arm joined to the chassis or another fixed area of the vehicle, with the aim of supporting the steering mechanism.

In turn, the motors that change the direction of the wheels are secured to the second suspension arm by adequate means.

With this steering system, automobiles gain interior space, as they are not encumbered with the steering column and the means that by turning the steering wheel, the user turns the wheels, reason for which in electric vehicles in which the space in the engine bay is limited, this will be of significant advantage, thus offering more space in the cockpit for passengers.

Other details and characteristics snail be shown throughout the description below referring to drawings attached to this report which are shown for illustrative but not limiting purposes only in a drawing of the invention.

DESCRIPTION OF THE DRAWINGS

Below is a list of the different parts of the invention, which are indicated in the following drawings with their respective numbers; (10) power steering system, (11) suspension, (12-13) motors, (15) support, (16) shock absorber, (17) first suspension arm, (18) second suspension arm, (19) appendixes, (20) shaft, (21) nuts, (22) neck, (23) lugs, (24) wheel axle, (25) body of the power steering system (10), (27) motor supports (12-13), (28) orifices, (29) neck opening (22), (30) lower cover, (31) lower base of the body (25), (32) crown gear, (33) driving pinions, (34) pinion shaft (33), (35) support studs (36), (36) support, (37) nuts, (36) spring, (39) mouth, (10) orifice, (41) wheel, (42) rim, (43) tyre, (44) crown gear base (32), (45) upper cover, (46) orifices, (47) support, (48) bearings, (49) gaskets, (50) cover hole (45), (51) transmission gearbox, (52) sealing caps, (53) eccentric elements, (54) bearings, (56) necks, (57) toothed parts, (58) nuts for lugs (23).

FIG. 6(*b*) is a partial exploded perspective view of main parts of the steering system (10), and more specifically of the transmission gearbox (51).

DESCRIPTION OF AN EMBODIMENT OF THE INVENTION

Figure 1:
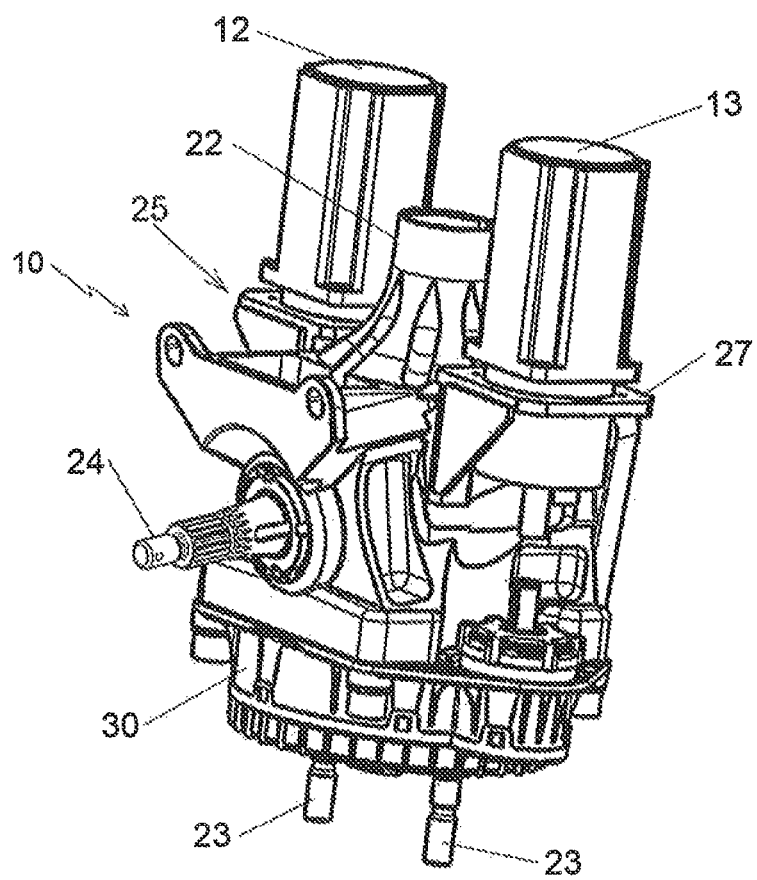
FIG. 1 is a perspective view of the steering system (10), consisting of a body or casing (25) inside and around which are the different parts of the steering mechanism and wheel (41) axle (24).

In one of the preferred embodiments of this invention, the steering system (10) is formed by a body (25), the casing of which houses the different essential parts of the steering mechanism inside, and which comprises, among others:

A steering transmission gearbox (51) using motors (12-13).
Suspension (11) with its arms (17-18).
Body (25) of the power steering system (10).
Wheel (41) axle (24).
Wheel (41), rim (42) and tire (43).

Figure 2:
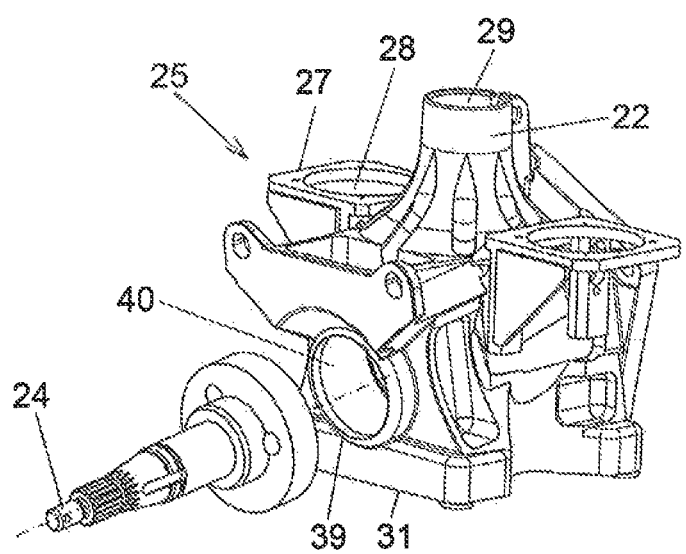
FIG. 2 is a perspective view of the front and upper part of the body (25), to which the lower cover (30) is fitted, at the bottom (31).
Figure 3:
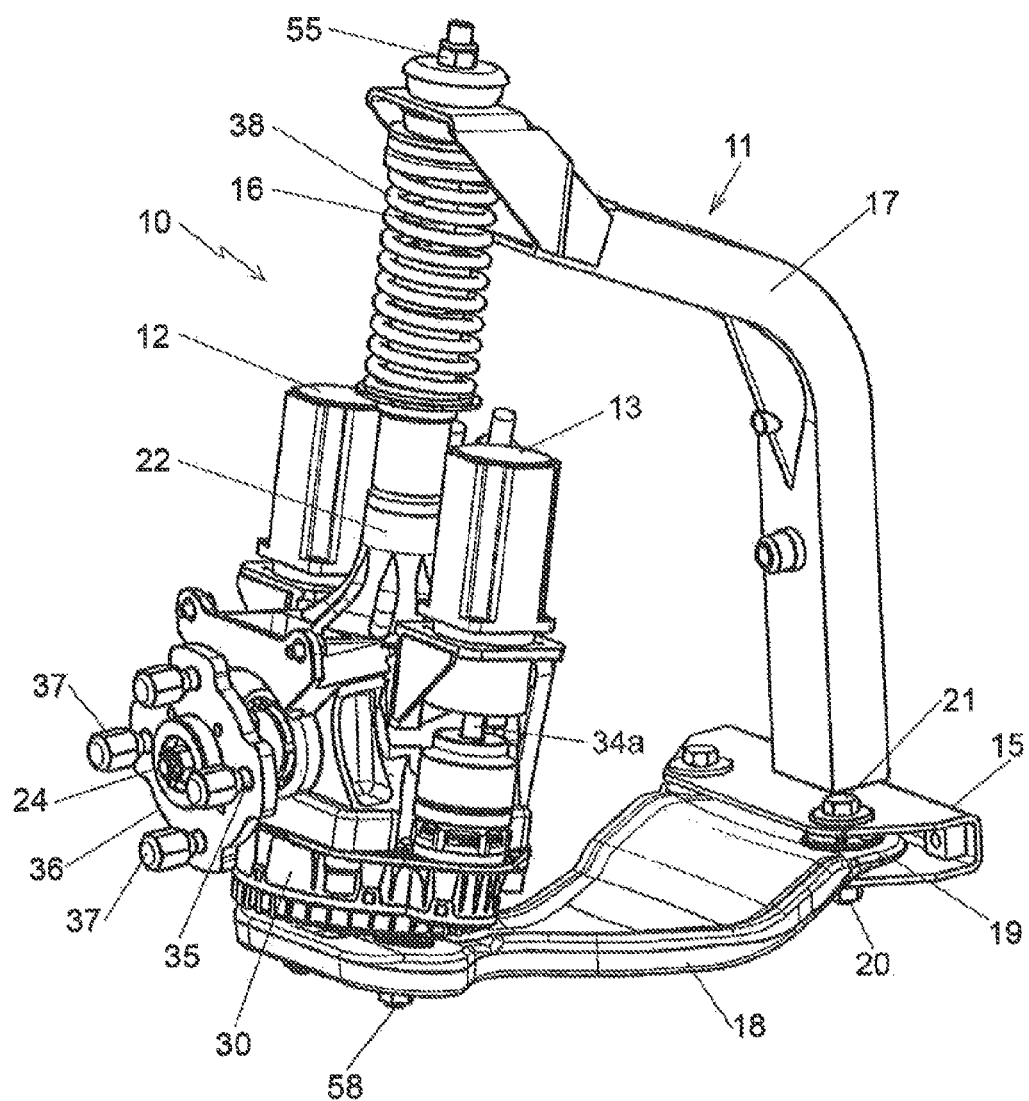
FIG. 3 is a perspective view of the steering system (10), fitted to the suspension (11), the main parts of which are the first suspension arm (17), the second suspension arm (18) and the shock absorber (16) with the spring (38) surrounding (16).

The suspension (11) comprises a first arm (17) that emerges from a support (15) joined to the chassis or being a part of it (not depicted in the drawings), and a second arm (18) attached to the support (15), including in its structure some projections (19), which have an orifice for securing the arm (18) with the aid of a shaft (20) that passes through the hole and nuts (21), which are threaded onto the ends of the shafts (20), while the shock absorber (16) is fitted on its upper end to the arm (17) and on its lower end to the body (25), and more specifically in its upper end, where there is a neck (22) in the body (25), which defines a mouth (29), see FIG. 2, for immobilising the lower part of the shock absorber (16), surrounding (16) the spring (38), the shock absorber (16) being the rotating arm of the steering system (10), and turning the body (25) and consequently the axle (24) of the wheel (41), around the crown gear (32) (all as shown in FIG. 3).

Figure 6:
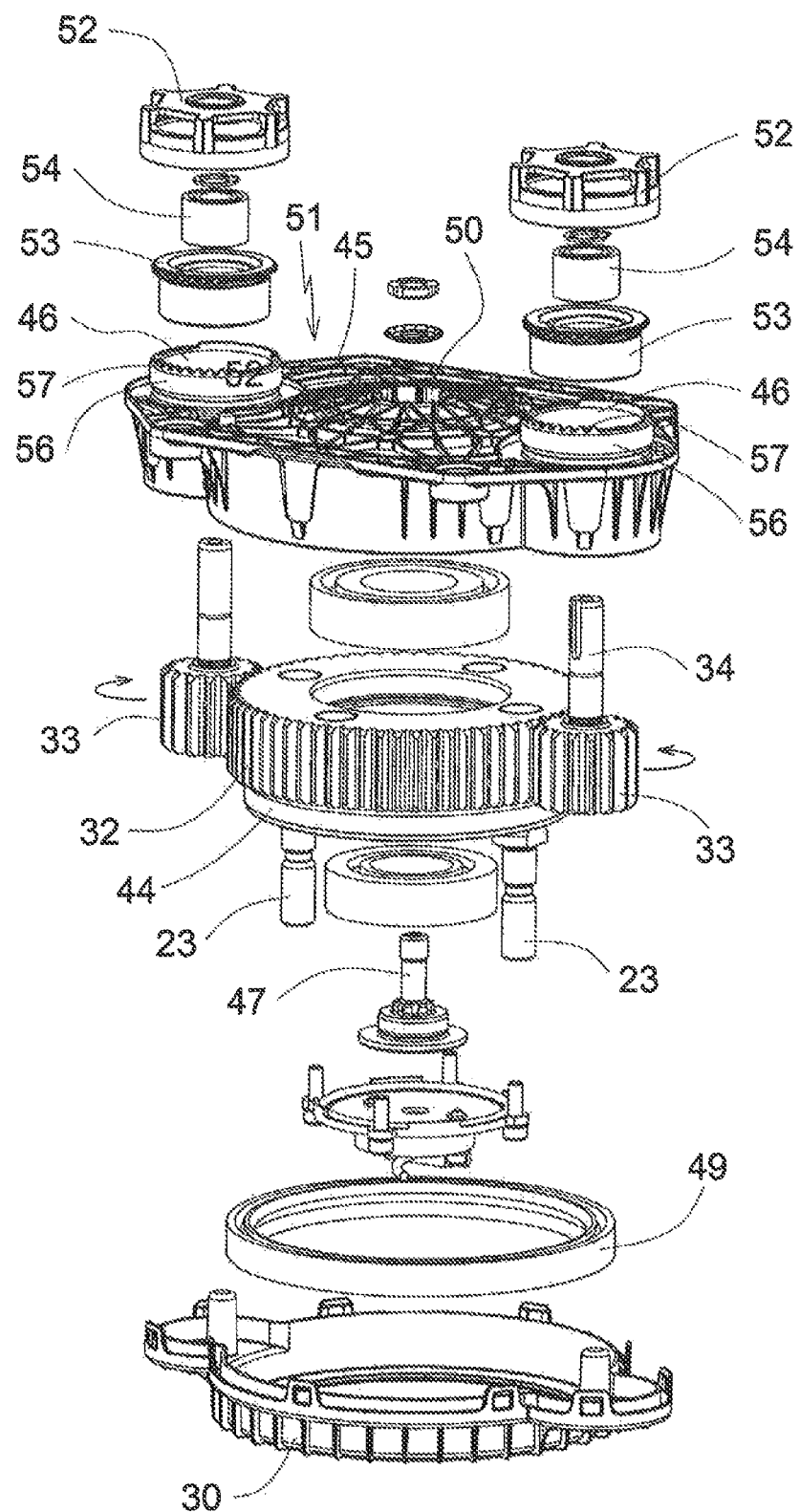
FIG. 6(*a*) is a partial exploded perspective view of main parts of the steering system (10), and more specifically of the transmission gearbox (51).
Figure 6:
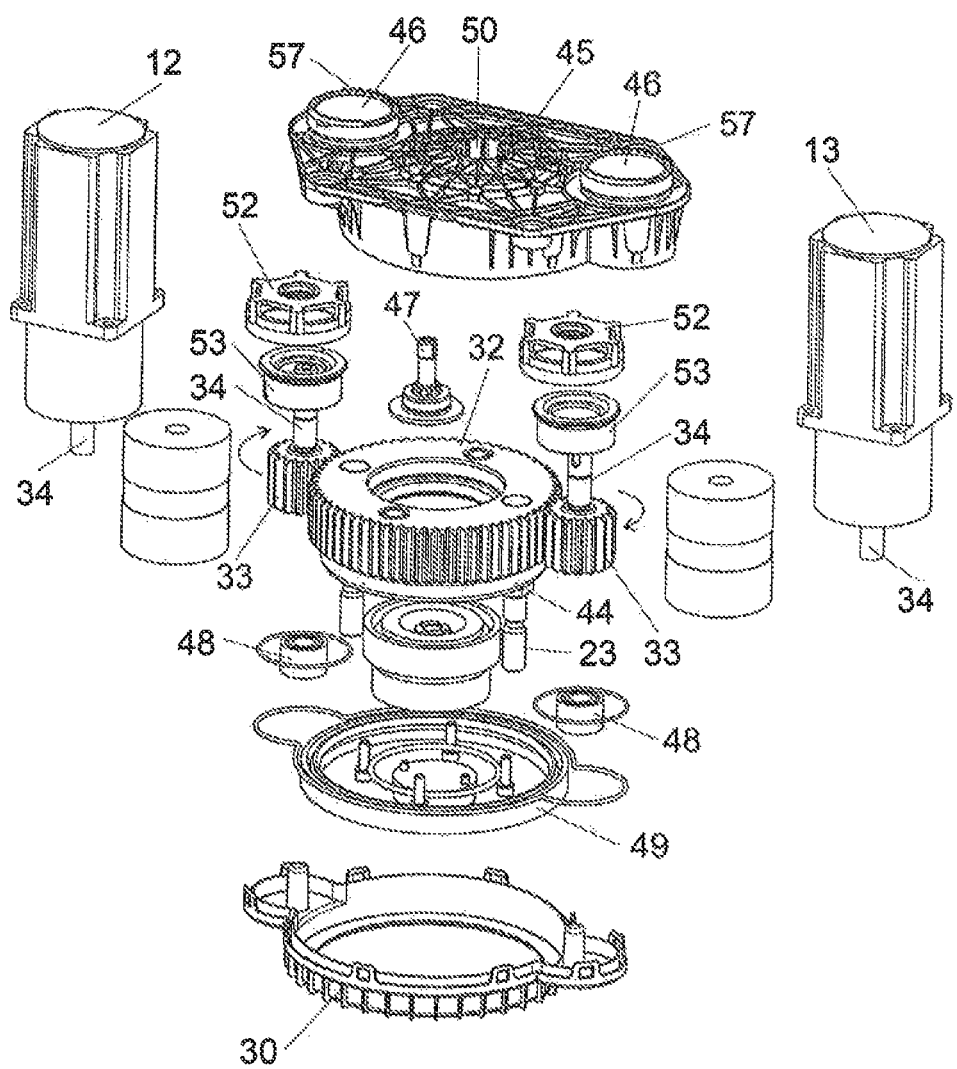
Figure 9:
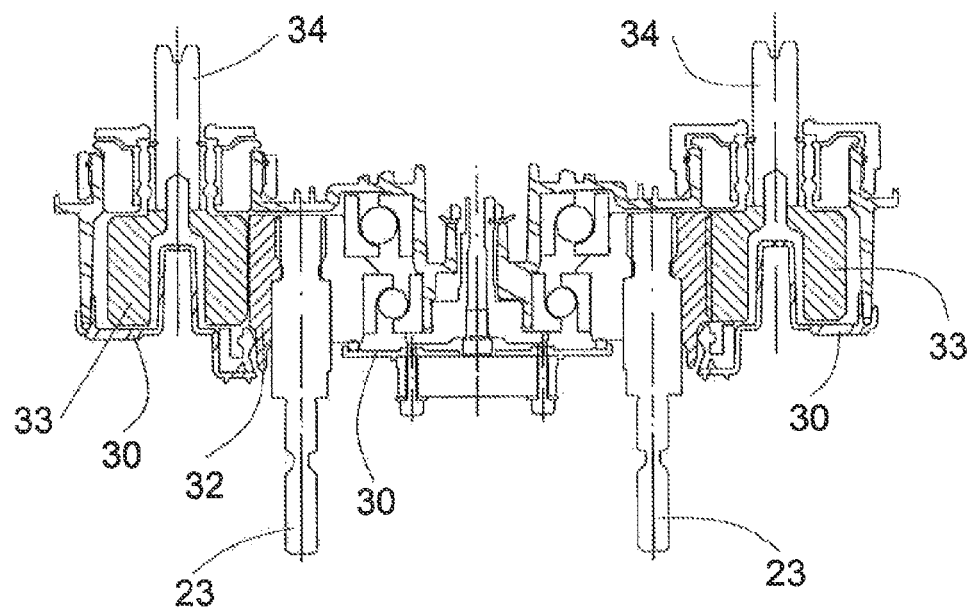
FIG. 9 is a section through A-A' of FIG. 8 in which the position of the lugs (23) in the crown gear is detailed (32).

The main elements found in the transmission gearbox (51) are a crown gear (32), that is fixed to a base (44) and two driving pinions (33), fitted (33) at the ends of motor (12-13) shafts (34), as can be seen in FIG. 9, these driving pinions (33) mesh with the crown gear (32) and (34) are moved by motors (12-13), which can be powered by electricity, pneumatic, hydraulic or the like, as can be seen in FIGS. 6(*a*) and 6(*b*), at the motors (12-13) are solidly attached to the supports (27), as can be seen in FIG. 1.

Figure 4:
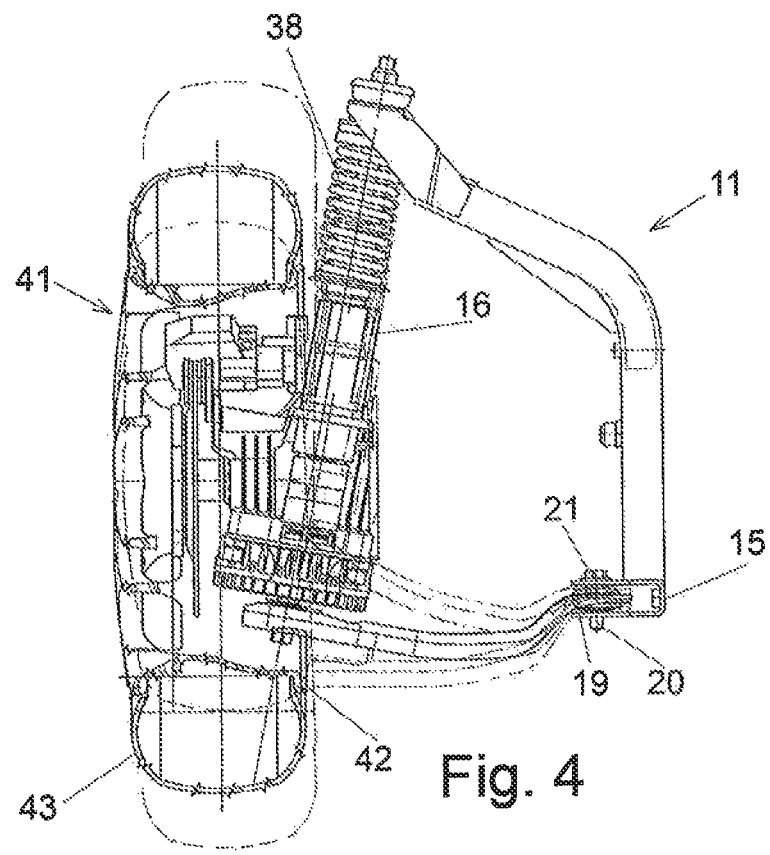
FIG. 4 is a front elevation view of the steering system (10), integrated into the suspension (11), incorporating the wheel (41), rim (42) and tyre (43).
Figure 5:
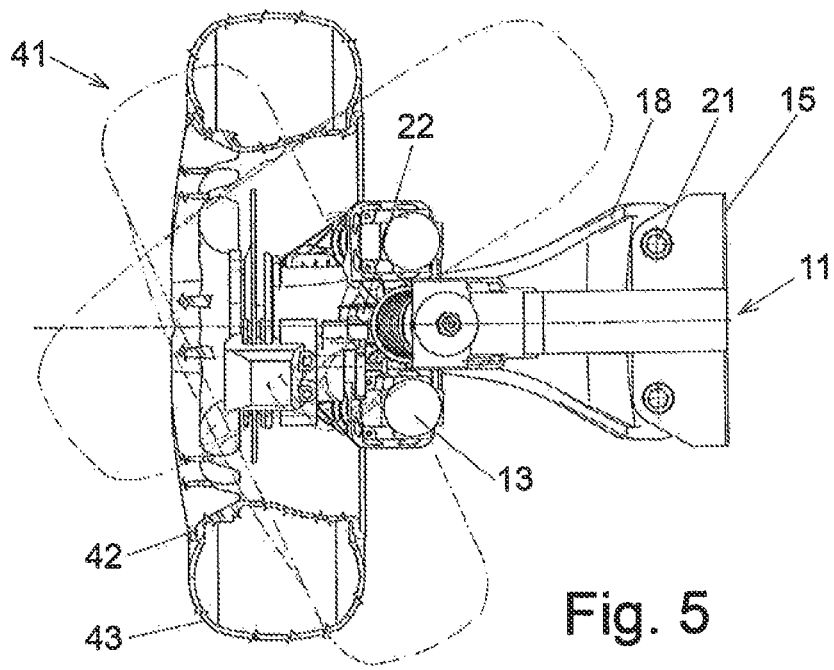
FIG. 5 is a top plan view of the steering system (10), integrated into the suspension (11), incorporating the wheel (41), rim (42) and tyre (43), indicating possible positions of the wheel when turning with dotted lines (41).

As shown in FIG. 2, the body (25) of the steering system (10) receives (as the corresponding orifice (40) has been machined in the front part in the mouth (39)) a shaft (24) at the front of the wheel (41), which comprises a rim (42) that incorporates a tyre (43) (as can be seen in FIGS. 4 and 5), while at the rear of the body (25) there can be a motor to move the shaft (24) with its gearbox (not depicted in the drawings), which is the object of another patent by the same inventor.

At the lower part of the body (25) of the steering system (10), protected by the upper cover (45) and the lower cover (30) of the transmission gearbox (51) is the mentioned crown gear (32), the driving pinions (33) are supported by bearings (48), see FIG. 6(*a*), securing the motors (12-13) on the supports (27) built into the body (25), in the orifices (46) made in the upper cover (45), and gaskets (49) between the lower cover (30) and the crown gear (32).

When the driving pinions (33) move around the crown gear (32) that remains fixed, the shock absorber (16) rotates, acting (16) as the rotation axle of the wheel (41), not depicted in FIGS. 6(a) and 6(b), the upper end, that of the shock absorber (16), is located in the arm (17) by means of a nut (55), with which it is secured to the orifice (29) and the lower part of mentioned shock absorber (16), in the body (25), as described below.

The mission of the motors (12-13) is to increase the torque generated in the steering wheel of the vehicle by the driver, technically it is not necessary to have more than one, however, for purely safety reasons, the steering system (10) with incorporate more than one motor, fitted to each steered wheel (41), but outside said wheel (41), as shown in FIGS. 4 and 5.

The body (25) of the steering system (10) incorporates at the bottom base (31), the gearbox (51) with the transmission mechanisms, and the lower cover (30) of (51) contains the crown gear (32) and the driving pinions (33) as mechanical means of transmission to turn the wheel (41) of the automobile (rim (42) plus tyre (43)), the latter (41) secured by means of studs (35) that project from the support (36), with nuts (37) (as can be seen in FIG. 3), in which the body (25) and the steering system (10) are incorporated into the suspension (11).

From the lower cover (30) of the transmission gearbox (51) emerge lugs (23) that fit onto the second suspension arm (18), and are secured with nuts (58), (as can be seen in FIG. 3).

The crown gear (32) is fixed to the lower cover (30), resting on its base (44), and the driving pinions (33) turn around the crown gear (32), together with the motors (12-13) and the upper cover (45), as well as the rotation axle (24) for turning the wheel (41), resting on the lower cover (30) of the gearbox (51), all as shown in FIG. 6.

The body (25) of the steering system (10) has been designed to act through the supports (27) as means for holding and immobilising the motors (12-13) (as shown in FIGS. 1 to 3), as the body (25) has some orifices (23) into which (12-13) fit the shafts (34) of one motors (12-13) facing downwards, at the lower end of the shafts (34) are the driving pinions (33).

Figure 7:
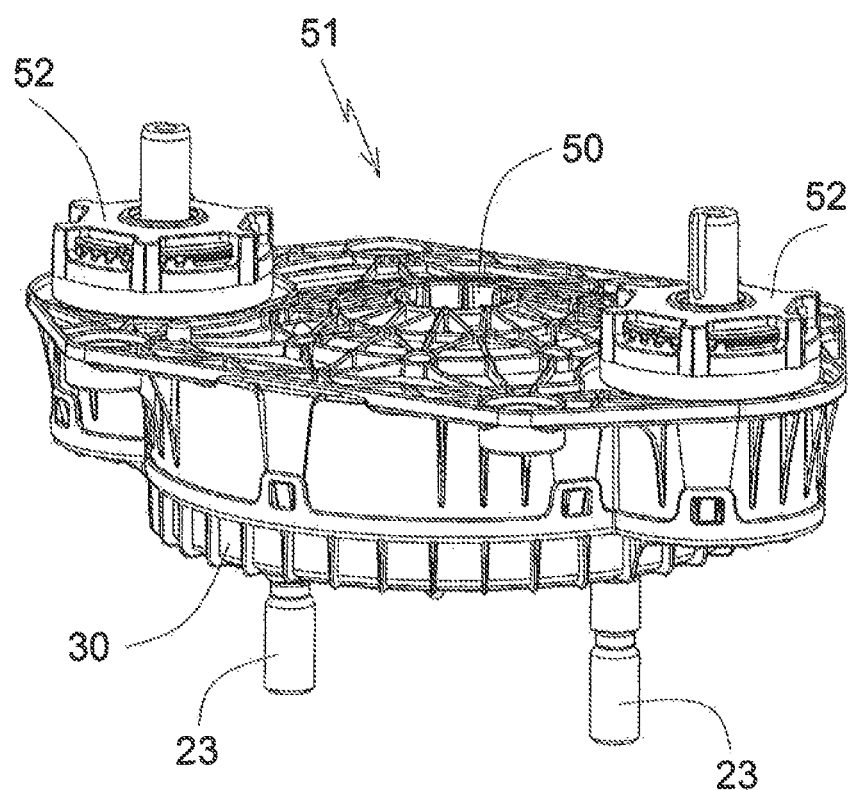
FIG. 7 is a perspective view of the transmission gearbox (51), from the bottom cover (30) of which emerge lugs (23) that fit into the second suspension arm (18).
Figure 8:
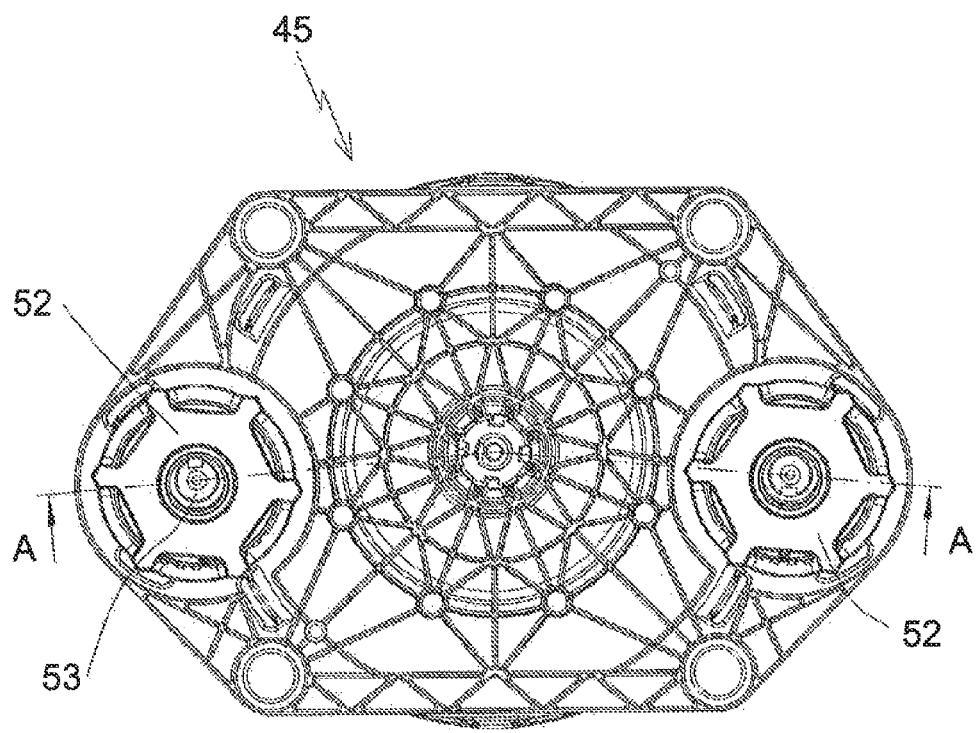
FIG. 8 is a top plan view of the upper cover (45) of the transmission gearbox (51) of FIG. 7.

Sealing caps (52) are threaded, into the orifices (46) made in the upper cover (45), and more specifically in the necks (56) made in the cover (45), and the upper edge of which holds the toothed part (57), as can be seen in FIGS. 6(a), 7 and 8. These necks (56), thanks to their teeth (57), receive the eccentric elements (53) that enable the alignment movement of the motor (12-13) shafts (34), and therefore the perfect fit between the toothed parts of the driving pinions (33) and the toothed parts of the crown gear (32).

As can be seen in more detail in FIG. 9, the lugs (23) fit to the crown gear (32), turning the driving pinions (33) by the action of the shafts (34) supported by their corresponding bearings The steering system (10) allows several options, one of which is the simultaneous turning of the steered wheels, or the turning of one four wheels, or both.

Having sufficiently described this invention using the attached drawings, it is easy to understand that any changes judged to be suitable may be made, whenever these changes do not alter of the essence of the invention summarised in the following claims.

The invention claimed is:

1. A power steering system for automobiles using motors to increase a torque supplied by a driver to a steering axle and steering wheel to vary a longitudinal inclination of a steered wheel, wherein the steered wheel comprises a rim that incorporates a tyre, wherein the system comprises a body to which one or more motors are attached by corresponding supports of the motors, wherein the one or more motors move the steering axle for the steered wheel, wherein the steering axle is a shock absorber, one end of the shock absorber pivots on a first suspension arm, while the opposite end fits to the body at an upper part of the body and solidly to a lower part of the body on a transmission gearbox, a fixed circular crown gear to which driving pinions mesh, wherein each driving pinion is fitted to an end of a shaft of each corresponding motor, the crown gear being fixed to a lower cover of the transmission gearbox with the driving pinions rotating round the crown gear, making the entire body and steering axle of the wheel turn.

2. The power steering system for automobiles according to the claim 1, wherein the body of the steering system incorporates the transmission gearbox at the lower part of said body, wherein the transmission gearbox comprises the lower cover from which emerge one or more lugs from the crown gear secured to the cover facing downwards, the lugs fit into and immobilize a second suspension arm, wherein gaskets are placed between the lower cover and the crown gear, and the lower part of the shock absorber is received in a neck and a mouth of the neck made in the upper part of the body, wherein an upper end of the shock absorber is surrounded by a spring and is secured to the first suspension arm.

3. The power steering system for automobiles according to claim 1, wherein the transmission gearbox has, between an upper cover and the lower cover, the crown gear secured to the lower cover, and the one or more driving pinions that rotate round the crown, turning the body of the system and also the turning axle of the steered wheel, wherein the steered wheel is located at a front part of the body.

4. The power steering system for automobiles according to claim 1, wherein the body of the steering system has an orifice in a front part of the body for the passage of a rotating axle of the steered wheel, wherein a wheel support is incorporated into the steered wheel by three or more studs with nuts on ends of the studs to immobilise the wheel of the vehicle to the wheel axle.

5. The power steering system for automobiles according to claim 1, wherein the motors that move the driving pinions can use electricity, pneumatic or hydraulic power.

6. The power steering system for automobiles according to claim 5, wherein the driving pinions can be straight cut or helical gears meshing with straight cut or helical gears in the crown wheel.

7. The power steering system for automobiles according to claim 1, wherein the vehicle comprises a plurality of steered wheels, each steered wheel turns on the respective steering axle of each steered wheel of the steering system.

8. The power steering system for automobiles according to claim 1, wherein the vehicle comprises four steered wheels which turn simultaneously on the steering axle of each respective steering system.

9. The power steering system for automobiles according to claim 1, wherein an upper cover of the transmission gearbox has one or more necks in orifices, an upper edge of the necks have toothed parts.

10. The power steering system for automobiles according to claim 9, wherein eccentric elements are fitted to the necks in the upper cover of the transmission gearbox for aligning the motor shafts and the corresponding driving pinions of the motor shafts on the crown gear.

11. The power steering system for automobiles according to claim 9, wherein caps are threaded onto the necks of the upper cover of the transmission gearbox.

\* \* \* \* \*